Jan. 9, 1940.  L. W. FLOOD ET AL  2,186,331
VACUUM MOLDING
Filed April 17, 1936  4 Sheets-Sheet 3
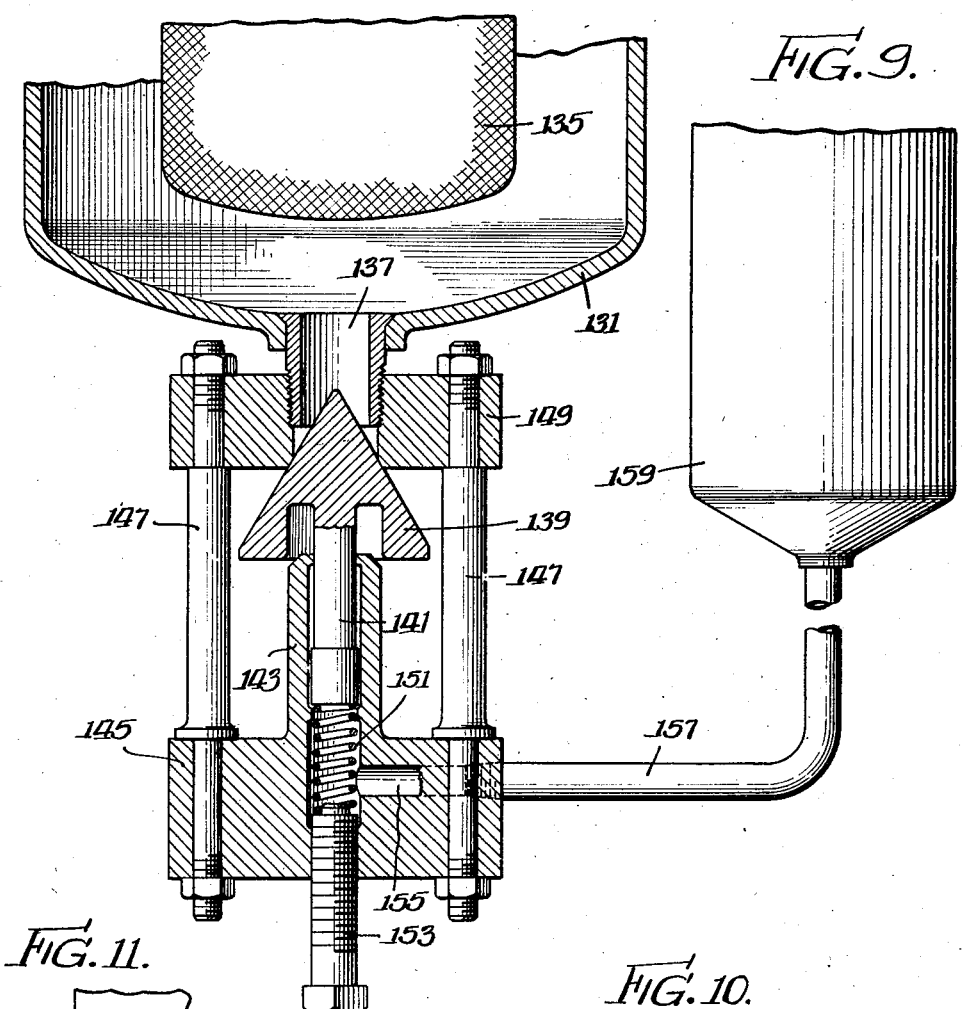
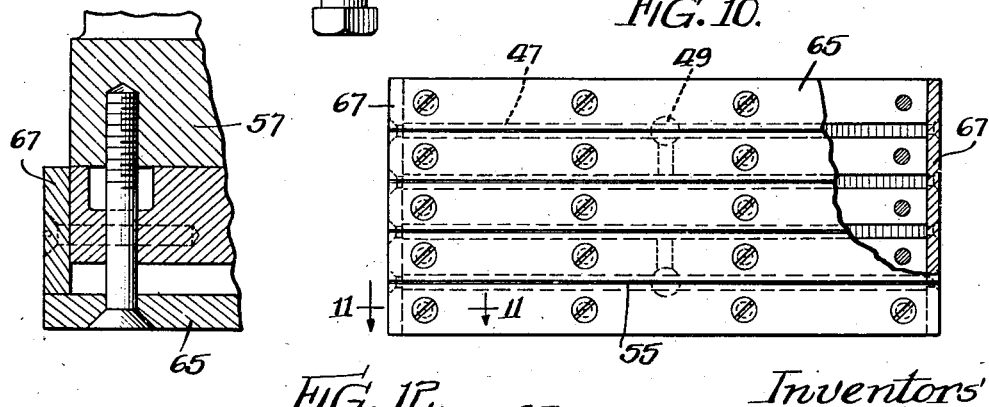
Inventors'
Leslie W. Flood
Earl B. Hagar
By: Cox & Moore attys.

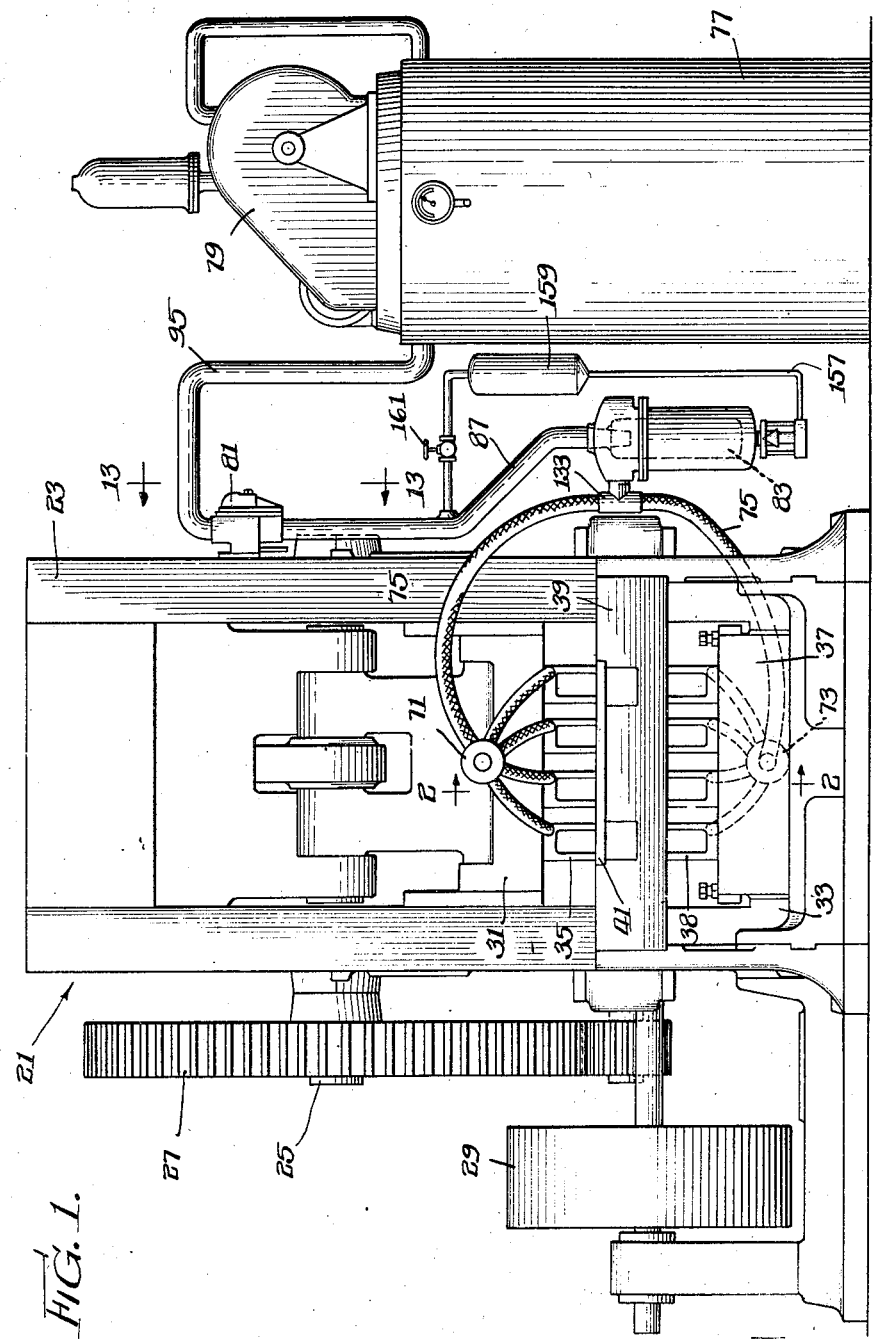

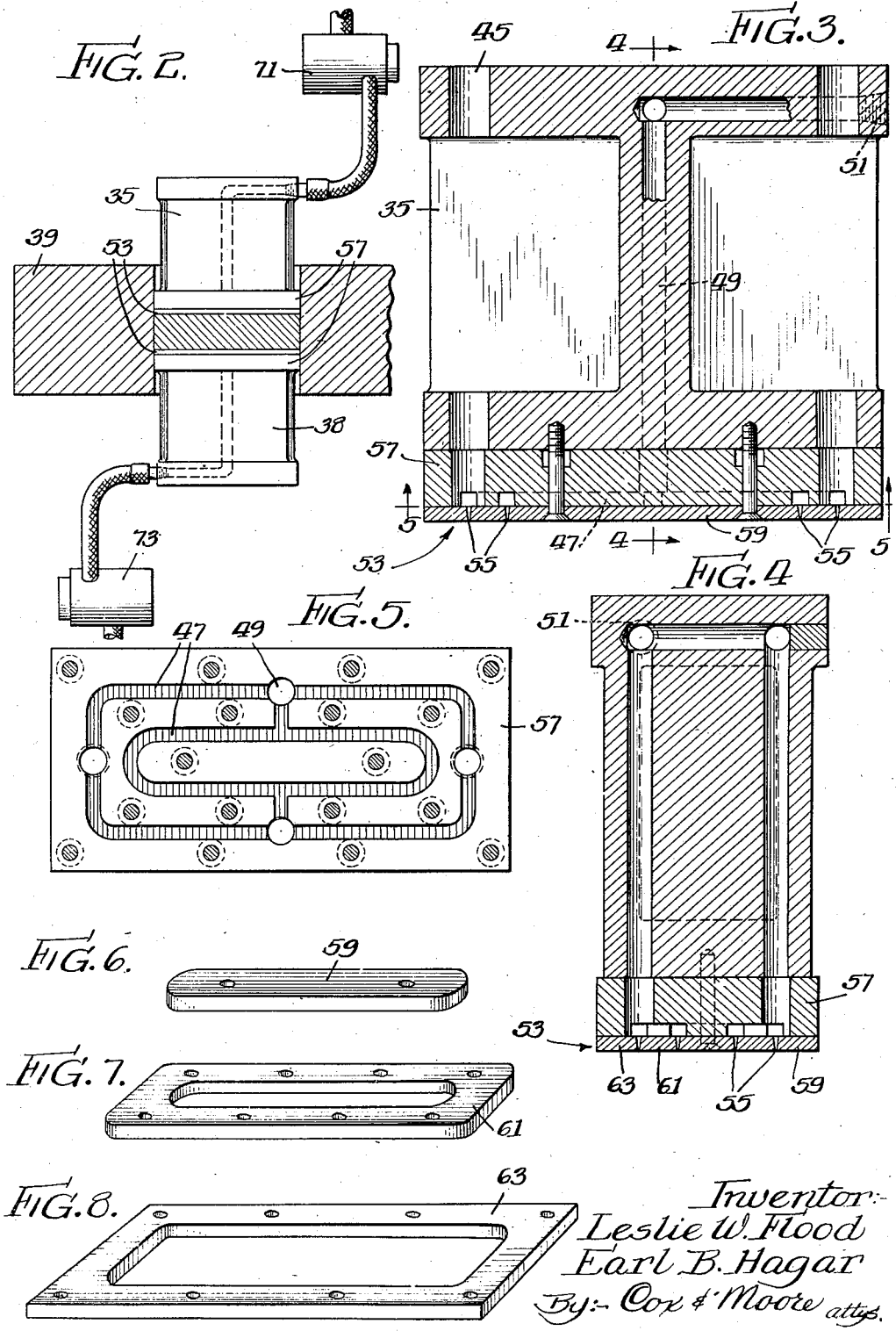

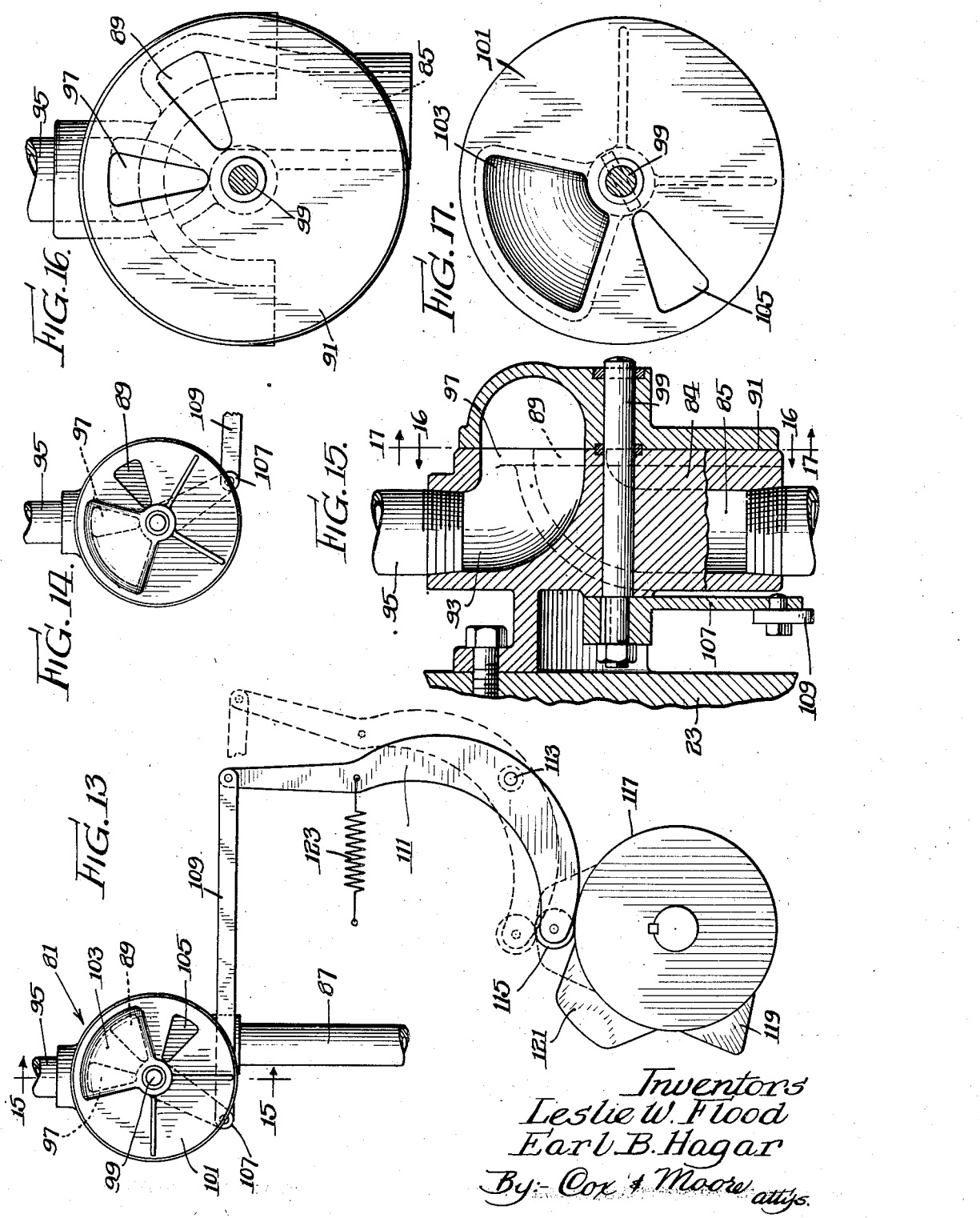

Patented Jan. 9, 1940

2,186,331

UNITED STATES PATENT OFFICE 2,186,331

VACUUM MOLDING

Leslie W. Flood and Earl B. Hagar, Chicago, Ill.

Application April 17, 1936, Serial No. 74,975

16 Claims. (Cl. 25—45)

Our invention relates in general to bricks and brick making and has more particular reference to the fabrication of bricks under vacuum condition.

An important object of the present invention is to provide means for pressing work material for the fabrication of bricks while maintaining vacuum conditions upon the material to the end that bricks of more uniform appearance, with stronger edges and corners, reduced porosity, greater density and greater resistance to fracture and breakage may be produced.

Another important object is to provide a mold for pressing bricks including die plates provided with hair-line slits whereby vacuum conditions may be applied to the work material being pressed.

Another important object resides in providing a brick-pressing die construction embodying a die element formed with channels and conduits adapted for attachment to vacuum means and opening upon grooves in the face of the die element, including plates connected on the face of said element over said grooves to provide a pressing face having slit-like openings communicating with the grooves and extending substantially over the area of the pressing face so that vacuum conditions may be applied to work material being pressed without clogging the slit-like opening.

Another important object is to form the plates of the pressing face as rectangular strips traversing the die element and defining the slit-like openings between the adjacent abutting edges of the rectangular strips.

Another important object resides in forming the plates comprising the pressing face of the die as substantially rectangular frames fitting one within the other and defining the slit-like openings between the inner and outer abutting edges of the adjacent frame.

Another important object is to provide a flexible vacuum connection whereby vacuum conditions may be applied to the dies while the same are in motion during the pressing operation; a further object being to interpose a manifold in said connection whereby vacuum conditions may be applied substantially equally to several dies of a battery.

Another important object is to provide vacuum to the pressing dies at predetermined intervals during the operating cycle of the press in order that vacuum conditions may be initiated in the die as it enters the pressing mold, vacuum being maintained until the die is about to leave the mold; a further object being to apply suction to the dies for a short period while out of the mold for scavenging purposes in order to clean the same.

Another important object is to provide vacuum-applying equipment including a novel release valve operable cyclicly in timed relationship with operation of the press in order to cause the application of vacuum conditions at desired intervals during the cycle of operation of the press.

Another important object is to provide a release valve adapted to connect the pressing dies alternately to atmosphere and to a vacuum tank or pump; a further object being to form the valve in simplified fashion as a rotating shutter adapted for camming operation from the drive shaft of the press.

Another important object is to provide vacuum means of the character mentioned having facilities for extracting and discharging from the system any dust or dirt drawn from the dies before the same can reach the vacuum tank or pump; a further object being to accomplish the foregoing by means of a dust extractor embodying a chamber connected with the dies and having a suction connection provided with a flexible screen adapted to collect the dust drawn into the chamber from the dies and to shake off the dust collecting thereon each time the vacuum connection is broken at the valve, as a result of flexing of the screen.

A further object is to provide means on the dust extractor automatically operable to open the chamber when the suction connection is broken to thus permit discharge of any dust collected in the chamber; a further object being to utilize the vacuum fluctuations to control the dust-ejecting mechanism.

Another important object is to provide means for warming the conduits of the suction system back to and including the dust extractor in order to prevent condensation of atmospheric moisture and thus avoid clogging of the connections due to the caking of dust in the presence of moisture; a further object being also to insulate the suction connections for the same purpose.

Numerous other objects, advantages and inherent functions of the invention will become apparent from the following description, which, taken in conjunction with the accompanying drawings, discloses the preferred embodiment of the invention.

Referring to the drawings:

Figure 1 is a front elevation of a brick press and associated vacuum equipment embodying our present invention.

Figure 2 is a sectional view taken substantially along the line 2—2 in Figure 1.

Figure 3 is an enlarged sectional view of a pressing die.

Figure 4 is a sectional view taken substantially along the lines 4—4 in Figure 3.

Figure 5 is a plan view of the face of the die element with plates forming the pressing face removed.

Figures 6, 7 and 8 are perspective views of plates forming the pressing face of the die shown in Figures 3, 4 and 5.

Figure 9 is an enlarged view partially in section of the dust extractor.

Figure 10 is a bottom view of a modified form of pressing die.

Figure 11 is a sectional view taken substantially along the line 11—11 in Figure 10.

Figure 12 is a perspective view of a plate forming, with similar plates, the pressing face of the die shown in Figure 10.

Figure 13 is a view taken substantially along the line 13—13 in Figure 1 to illustrate the vacuum control valve.

Figure 14 is a view showing the valve in shifted position.

Figure 15 is an enlarged view of the valve taken substantially along the line 15—15 in Figure 13, and Figures 16 and 17 are views taken respectively along the lines 16—16 and 17—17 in Figure 15.

To illustrate our invention, we have shown on the drawings a brick press 21 comprising a main frame 23 carrying a crank-shaft 25 provided with a driving gear 27 by means of which the crank-shaft may be rotated by the operation of the motor 29.

The press includes upper and lower cross-heads 31 and 33 adapted to be moved during the rotation of the shaft 25 in order to perform the brick-pressing operation. The upper cross-head carries a plurality of die elements 35 and the lower cross-head carries a saddle plate 37 on which are mounted a plurality of die elements 38 respectively opposite the upper die elements 35. The corresponding upper and lower die elements operate in cavities formed in a mold table 39. The mold table carries a die plater or pad plate 41, and the mold cavities may be provided with liner of any suitable or preferred character.

As the drive shaft 25 is rotated the upper and lower die plungers are moved relatively with respect to the mold table 39 and the upper plungers at least, are alternately retracted entirely from the mold cavities at which time the work material to be pressed is delivered in said cavities upon the upper faces of the lower die plungers 38, which elements at such time are retracted to their lowermost position in the die cavities, the pressing faces in the die elements, however, being within the cavities to support the charges therein. The loading or charging operation may be accomplished by any suitable or preferred mechanism for delivering the work material from a conveniently located hopper in predetermined quantities into the molding cavities while the upper die plungers are in raised position.

After the mold cavities are thus loaded each with a charge of work material continued rotation of the drive shaft 25 will cause the die plungers to descend and enter the molding cavity and at the same time the lower saddle 37 may be raised within the frame to elevate the lower plungers in the mold cavity and thus accomplish the brick pressing operation by and between the lower and upper plunger. After pressing is completed the lower dies continue to move upwardly in the mold cavities during the retraction of the upper plungers so that the pressed bricks are raised between the upper and lower plungers to the upper level of the mold table. At such time a pusher element is advanced to move the bricks forwardly onto the mold table at the same time that the loader mechanism advances between the plungers to introduce a further or successive charge into the mold cavities. The lower plungers then descend in the die plate or table and the cycle of operation is completed.

We propose to apply vacuum conditions to the charge of work material during the pressing operation within the die cavities of the mold table in order to produce bricks having superior characteristics including increased density, greater strength, reduced porosity, more uniform appearance and stronger edges and corners. By pressing the work material under vacuum conditions also rebound and explosion of the brick at the conclusion of the brick pressing operation and caused by the sudden release of pressure from air accidentally entrapped in the brick, is substantially eliminated.

To this end we provide means for applying reduced pressure condition upon the work material during the pressing operation in the mold cavities of the table 39 and while we prefer to apply the suction by means of conduits and slits formed in the movable pressing elements 35 and 38, we may also accomplish our purpose by applying the conduits and slits in the table 39. For reasons hereinafter set forth, however, we prefer to evacuate the mold by means of suction applied through the pressing elements 35 and 38.

Each of the plungers 35 and 38 comprises a preferably rectangular block or frame secured in proper relative position upon the upper cross-head 31 or the saddle plate 37, as the case may be, the blocks being provided with suitable apertures 45 for accomplishing such attachment. The lower faces of the blocks are provided with communicating grooves 47, which in turn are connected with ducts 49 extending in the body of the plungers to a preferably threaded opening 51 by means of which the ducts 49 and grooves 47 may be connected by a vacuum system. The face of each block has a plurality of plates 53 secured thereto in position covering the grooves 47, the plates 53 being shaped so that slits 55 of hair-like dimension open upon the working face of the pressing element. These slits extend between the plates 53 and communicate with the grooves 47 so that when suction is applied at the opening 51 the mold may be evacuated through the slits 55.

The construction of the pressing element may be accomplished in any suitable or preferred manner in order to provide slit-like openings. In Figures 3–8 we have shown the die plungers 35, 38 faced with an intermediate plate 57 in which the grooves 47 are formed in the manner shown in Figure 5. The plates 53 comprise an elongated central element 59, a somewhat rectangular frame-like element 61 adapted to encircle the central element 59 and an additional frame-like element 63 adapted to encircle the element 61, so that the slits 55 comprise a pair of concentric, somewhat oval slots.

The die shown in Figures 10, 11 and 12, however, comprises a plate 57 in which the grooves 47 extend in parallel relationship between the opposite end of the plate 57 while the facing plates 53 comprise rectangular strips 65, arranged in adjacent edge-abutting relationship with the slits 55 defined between the abutting edges of adjacent strips 65 and disposed opposite the grooves 47. The opposed ends of the slot 47 in the form shown in Figure 10 are sealed by end plates 67.

We find that the slit-like form of opening is adapted to evacuate the mold without becoming clogged as is the case where openings of substantial size are employed. The slit-like openings may be of minute width without impairing the evacuation since the slits extend substantially to all parts of the operating pressing face of the die. The plates 53 also are preferable arranged so that the slots 55 widen inwardly of the pressing face so that any work material becoming lodged in said slots may be drawn readily inwardly thereof and into the grooves 47 and channels 49, whence the dust may be drawn into the evacuating system.

The foregoing die construction may be embodied in dies otherwise provided with means for heating the same either by steam or electrically.

Each of the dies also is connected with a suction manifold 71 while the lower dies 38 are connected with a similar manifold 73, the lower manifold 73 being preferably disposed behind the saddle plate 37 while the upper manifold 71 is carried on and in front of the upper cross-head 31. The manifolds 71 comprise chambers of substantial size connected to each of the die elements by separate conduits in order that each element may be subjected to the same suction. Both manifolds 71 and 73, however, are connected preferably by means of a flexible conduit 75 with suction apparatus which is adapted to apply reduced pressure in the grooves 47 at predetermined intervals during the operating cycle of the press. We prefer to apply suction on the dies for a short period before the molds are charged with work material in order to remove any dust which may have become lodged in the openings 55, or in the conduits and grooves 49 and 47. After the scavenging operation is completed the suction is preferably discontinued while the mold is charged with work material, but is applied again as the upper dies 35 enter the mold cavities, suction being continued until the conclusion of the pressing operation and until the brick ejecting movement of the dies commences. The die is thus evacuated and all occluded air withdrawn from the work material as the movable die elements perform the pressing operation, so that the work material may become closely packed and consolidated in the absence of entrapped air.

The exhaust equipment comprises a vacuum tank 77, and exhaust pump 79 for evacuating the tank, and a connection from the tank through a valve 81 and a dust ejector 83 to the conduits 75. The valve 81 functions to connect the vacuum tank with the dies through the dust extractor 83 at the desired intervals during the operating cycle of the press. To this end the valve 81 comprises a frame 84 having a conduit 85 connecting at one end with a pipe 87, which leads to the dust extractor. The other end of the conduit 85 opens as at 89 on a surface of the frame 84 forming a valve seat 91. The frame 84 has a second channel 93 connecting at one end with a pipe 95 leading to the vacuum tank 77. The channel 93 opens at its other end as at 97 upon the valve seat 91. The frame 84 carries a shaft 99 pivotally mounted therein and having an end extending outwardly of the valve seat 91. The projecting end of the shaft 99 carries a valve element 101 formed with a closed cavity 103 and an opening 105 disposed in such position in the valve element 101 that when it is in the position illustrated in Figure 13, the pipes 87 and 95 are placed in communication because the cavity 103 bridges the openings 89 and 97. When the valve element, however, is rotated to the position illustrated in Figure 14, the pipe 87 is opened to atmosphere through the valve opening 105, while at the same time the pipe 95 is not uncovered because the valve element remains in position covering the opening 97.

The stem 99 carrying the valve 101 may be rocked to move the valve alternately between the positions shown in Figures 13 and 14. To this end the shaft 99 carries an arm 107 to which is attached a connecting rod 109, which in turn is connected on a lever 111 pivoted at 113 and having an end provided with a cam-following roller 115. The roller 115 is supported in position to follow a cam element 117 which is driven in timed relationship with respect to the press. This cam 117 has lands 119 and 121 adapted to shift the valve whenever it is desired to release or apply vacuum conditions in the die elements and the cam-following 115 is normally urged upon the cam element 117 by means of a spring 123 connected to the lever 111.

From the foregoing it will be apparent that dust may be drawn into the vacuum connections but it is undesirable to permit such dust to reach the vacuum tank 77. We therefore provide the dust ejector 83 in the suction line between the dies and the tank. This ejector comprises a housing 131 having a fitting 133 in its upper portions, whereby the tank is connected with the conduit 75 leading to the dies. The upper portions of the tank also are connected with the conduit 87, which has an end extending into the container 131. A dust screen 135, comprising preferably a fabric bag is attached upon the end of the pipe 87 within the casing 131. As soon as the suction tank is connected with the pipe 87, through the valve 81, the bag 135 will collapse. Any dust drawn into the casing 131 at such a time will collect upon the outer surfaces of the bag. As soon as suction is released, however, by the connection of the pipe 87 to atmosphere, the pressure differential thus created inside and out of the bag will cause the same to expand and shake off any dust collected thereon. Such dust falls to the bottom of the casing 131. The casing is provided with a discharge outlet 137, which is normally closed by the valve element 139. The element 139 has a stem 141 traveling in a sleeve-like portion 143 carried in a frame 145. The frame 145 is connected as by the mounting elements 147 to a yoke 149, which yoke is threaded upon the pipe forming the outlet 137.

The frame 145 carries a compression spring 151 in position behind the stem of the valve element 139 to urge the same toward closed position sealing the opening 137. Tension of the spring 151 may be adjusted by means of the threaded element 153. The element 139 thus normally fills the opening 137 but we provide means for retracting the element 139 against the urge of the spring 151 at intervals in order to permit dust collecting in the container 131 to be automatically expelled. To this end the frame 145 is provided with a duct 155 opening into the sleeve 143 behind the plunger 141. The duct 151 is connected by means of a pipe 157 to an enlarged casing 159, which is in turn connected through a valve 161 with the pipe 87. During the interval when the pipe 87 is connected with the suction tank 77 suction will be applied through the tank 159 and pipe 157 to the space behind the plunger 141. This, however, will not cause the plunger to open because equal vacuum conditions prevail within the casing 131 and are effective upon the head of the plunger so that the spring 151 maintains the plunger closed. When the suction connection with the tank 77 is broken by the valve 81, however, vacuum conditions will be maintained behind the plunger 141 for a greater length of time than in the dust collector 131, this because of the restriction provided by the valve 161. As soon as pressure conditions in the tank 131 increase to atmospheric, the spring 151 may no longer hold the valve 139 in closed position against the suction applied through the conduit 157 from the enlarged tank 159. The valve 139 will consequently be retracted and permit dust to escape through the opening 137. During the operation of the apparatus air containing more or less moisture will be drawn through the dies and into the manifolds 71 and 73, the conduits 75, and the dust collector 131. When vacuum conditions prevail, there is a tendency for such moisture to be precipitated upon the inner walls of the manifolds, conduits and tanks. Such precipitation in the presence of dust, will cause the dust to collect and cake upon the manifolds, conduits and dust collector. This, of course, is undesirable and to overcome the difficulty we propose to insulate the tank 131, the conduits 75, the manifolds and the ducts leading to the pressing dies, and also to provide for heating the same preferably by electrical heating means contained in the insulation in order thus to prevent the deposition of moisture on the parts mentioned.

It is thought that the invention and its numerous attendant advantages will be understood from the foregoing description, and it is obvious that numerous changes may be made in the form, construction, and arrangement of the several parts of the illustrated apparatus without departing from the spirit or scope of our invention or sacrificing any of its attendant advantages, the form herein described being merely for the purpose of illustrating the invention.

We claim:

1. Apparatus for pressing bricks comprising a brick-pressing mold having openings in a pressing surface thereof, vacuum exhaust means, conduit means connecting the exhaust means with said opening whereby to effect vacuum conditions in the mold, valve means in said conduit means for selectively connecting said openings with said exhaust means and with atmosphere, means to actuate the mold to press a brick, and means operable in timed relationship with said actuating means for automatically operating said valve at predetermined times during the actuation of the mold.

2. Apparatus for pressing bricks comprising a brick-pressing mold having openings in a pressing surface thereof, exhaust means adapted to be connected with said openings whereby to evacuate the molds, dust-collecting means between the exhaust means and the mold, means to automatically connect said exhaust means with said openings and said dust collector at predetermined times during the brick-pressing operation, and means automatically operable for discharging the dust from said dust-collecting means at other times during said brick-pressing operation.

3. Apparatus for pressing bricks comprising a brick-pressing mold having openings in a pressing surface thereof, exhaust means and means operable to connect said openings selectively with the exhaust means and with atmosphere, a dust collector between the mold and the exhaust means, means to actuate said pressing surface for pressing a brick in the mold, and means operatively connected with said actuating means for automatically operating said operable means to connect said openings with the exhaust means at predetermined times during the actuation of the mold.

4. Apparatus as set forth in claim 3 wherein the means operable to connect the mold openings with the exhaust means comprises a valve operable alternately to connect the mold with said exhaust means and with atmosphere.

5. Apparatus as set forth in claim 3 wherein the dust collector and the conduit connecting the same with the mold are insulated, and provided with heating means for preventing cooling of said parts.

6. Apparatus as set forth in claim 3, including means to heat the dust collector and the conduits connecting same with the mold in order to prevent condensation of atmospheric moisture therein when exhaust conditions prevail.

7. Apparatus as set forth in claim 3 wherein the means for connecting the mold with the exhaust means comprises a valve having a pair of channels connectable one with the mold and the other with the exhaust means, and a shutter shiftable between a position interconnecting said channels and another position closing one channel and opening the other to atmosphere.

8. Apparatus as set forth in claim 3 wherein the dust collector comprises a casing connected with the mold and with the exhaust means, a flexible dust screen in said casing and adapted to collect dust drawn from the mold while vacuum conditions prevail, and to release the collected dust into the casing when vacuum conditions are discontinued.

9. Apparatus as set forth in claim 3 wherein the dust collector comprises a casing connected with the mold and with the exhaust means, a dust screen in said casing in position to collect dust drawn from the mold and to deposit the same in the casing, and means operable at intervals during the operating cycle of the apparatus for discharging collected dust from said casing.

10. Apparatus as set forth in claim 3 wherein said dust collector comprises a casing connected with the mold, a collapsible dust screen in said casing, conduit means connecting said dust screen with the exhaust means, and means in said conduit for alternately admitting vacuum or atmosphere to said casing whereby to collect dust on the screen during evacuation and to throw off the dust so collected by distention of the screen during admission of atmospheric pressure.

11. Apparatus for pressing bricks comprising a brick-pressing mold having openings in a pressing surface thereof, vacuum exhaust means adapted to be connected to said openings to exhaust air from the work material during pressing, means to actuate said brick-pressing mold to press bricks therein, means automatically operable to selectively connect said vacuum exhaust means with said openings when the mold is filled with work material whereby to degasify said material, said automatically operable means being alternately operable to connect said vacuum exhaust means to said openings when the mold is empty whereby to clear said openings.

12. Apparatus for pressing bricks comprising a mold for receiving work material to be pressed, pressing elements having slit-like openings by means of which the pressure condition in the mold during the pressing operation may be controlled, actuating means for the pressing elements, said slit-like openings being of a narrow dimension sufficient to resist clogging and being in communication with a source of vacuum, and means operatively connected with said actuating means for automatically interrupting said communication with said source of vacuum in timed relationship to the pressing operation.

13. Apparatus for pressing bricks comprising a brick-pressing mold having surfaces adapted to be relatively moved for pressing brick-making material therebetween, openings in the pressing surfaces thereof, means for actuating said mold surfaces to press a brick, exhaust means connected with said openings, a valve for controlling the application of suction in the molds through said openings, and means operatively connected with said actuating means for automatically operating said valve at predetermined times during the actuation of the mold.

14. Apparatus for pressing bricks comprising a die having conduits therein adapted for connection with exhaust means, means forming a pressing face on said die formed with slit-like openings communicating inwardly with said conduits, said slit-like openings being of narrow width sufficient to resist clogging by the work material, means for relatively actuating a portion at least of said die to press a brick in the die, suction means having connection with said conduits, valve means for controlling the application of suction to the die through said conduits, and means operatively connected with said actuating means for automatically operating said valve at predetermined times during the actuation of the die for evacuating said slit-like openings whereby to draw gases from the charge in the die.

15. Apparatus for pressing bricks comprising a die formed with a pressing face formed with a plurality of slit-like openings, said slit-like openings being of relatively minute width adjacent the pressing face and widening progressively inwardly thereof to prevent lodging of work material therein, actuating means for said pressing apparatus and adapted to relatively actuate a portion at least of said die to press a brick in the die, suction means having connection with said openings for evacuating the slit-like openings, valve means for controlling the application of suction to the die through said openings, and means operatively connected with said actuating means for automatically operating said valve at predetermined times during the operation of said actuating means for removing gases from the material acted upon by the die.

16. Apparatus for pressing bricks comprising a die having a pressing face formed with slit-like openings, internal ducts within the die communicating with said openings, said openings widening inwardly of the pressing face of the die, actuating means for said pressing apparatus and adapted to relatively actuate a portion at least of said die to press a brick in the die, suction means having connection with said openings for evacuating the slit-like openings, valve means for controlling the application of suction to the die through said openings, and means operatively connected with said actuating means for automatically operating said valve at predetermined times during the operation of said actuating means for removing gases from the material acted upon by the die.

LESLIE W. FLOOD.
EARL B. HAGAR.